US010189302B2

(12) United States Patent
Mayer Pujadas et al.

(10) Patent No.: US 10,189,302 B2
(45) Date of Patent: Jan. 29, 2019

(54) WHEEL TRIM

(71) Applicant: Zanini Auto Grup, S.A., Parets Del Valles (Barcelona) (ES)

(72) Inventors: August Mayer Pujadas, Parets Del Valles (ES); Marçal Mascaró Hereza, Parets Del Valles (ES); Juan José Ucher Tena, Parets Del Valles (ES); Guillem Cominguez Santaló, Parets Del Valles (ES)

(73) Assignee: ZANINI AUTO GRUP, S.A., Parets Del Valles (Barcelona) (ES)

( * ) Notice: Subject to any disclaimer, the term of this patent is extended or adjusted under 35 U.S.C. 154(b) by 0 days.

(21) Appl. No.: 15/325,168

(22) PCT Filed: Jul. 10, 2015

(86) PCT No.: PCT/EP2015/065850
§ 371 (c)(1),
(2) Date: Jan. 10, 2017

(87) PCT Pub. No.: WO2016/005565
PCT Pub. Date: Jan. 14, 2016

(65) Prior Publication Data
US 2017/0182839 A1 Jun. 29, 2017

(30) Foreign Application Priority Data

Jul. 10, 2014 (EP) ..................................... 14176538
Jan. 23, 2015 (EP) ..................................... 15382013

(51) Int. Cl.
*B60B 7/04* (2006.01)
*B60B 7/00* (2006.01)
(Continued)

(52) U.S. Cl.
CPC .............. *B60B 7/04* (2013.01); *B60B 7/0086* (2013.01); *B60B 7/06* (2013.01); *B60B 7/10* (2013.01);
(Continued)

(58) Field of Classification Search
CPC ... B60B 9/00; B60B 2360/32; B60B 2310/30; B60C 7/10
(Continued)

(56) References Cited

U.S. PATENT DOCUMENTS 4,262,967 A * 4/1981 Spisak ...................... B60B 7/10
301/108.1
8,801,107 B2 * 8/2014 Schmid ..................... B60B 3/10
301/37.107
(Continued)

FOREIGN PATENT DOCUMENTS

DE 101 61 868 A1 7/2003
DE 10 2009 057 164 A1 6/2011
(Continued)

OTHER PUBLICATIONS

International Search Report issued by the International Searching Authority (ISA/O.E.P.M.) on Oct. 24, 2016 in connection with International Application No. PCT/EP2015/065850.

*Primary Examiner* — S. Joseph Morano
*Assistant Examiner* — Jean W Charleston
(74) *Attorney, Agent, or Firm* — Gary J. Gershik; Cooper Dunham LLP

(57) ABSTRACT

The wheel trim (1) comprises a base element (2) provided with holes (3) and a cover element (4) placed on said base element (2), the cover element (4) being linked with the base element (2) by a speed activation element (5) and said cover element (4) being movable between a rest position, in which the holes (3) are not covered, and an active position, in
(Continued)

which the holes (3) are completely or partially covered, when the rotating speed of the wheel is higher than a preset speed, and it is characterized in that the cover element (4) is also linked with the base element (2) by a temperature activation element (6), so that when the temperature sensed by said temperature activation element (6) is higher than a preset temperature, the temperature activation element (6) moves the cover element (4) to said rest position.

20 Claims, 9 Drawing Sheets

(51) Int. Cl.
    *B60B 7/10*     (2006.01)
    *B60B 7/20*     (2006.01)
    *B60B 7/06*     (2006.01)

(52) U.S. Cl.
    CPC ........ *B60B 7/20* (2013.01); *B60B 2900/1216* (2013.01); *B60B 2900/513* (2013.01); *Y02T 10/88* (2013.01)

(58) Field of Classification Search
USPC ........ 301/6.3, 37.25, 37.102, 37.106, 37.107
See application file for complete search history.

(56) References Cited

U.S. PATENT DOCUMENTS 8,857,921 B2* 10/2014 Schmid .................... B60B 3/10
                                                                    301/37.107
2009/0195053 A1* 8/2009 Kruse ................... B60B 7/0053
                                                                    301/6.4

FOREIGN PATENT DOCUMENTS

DE    10 2011 016 534 A1    2/2012
DE    10 2011 010 509 A1    8/2012

* cited by examiner

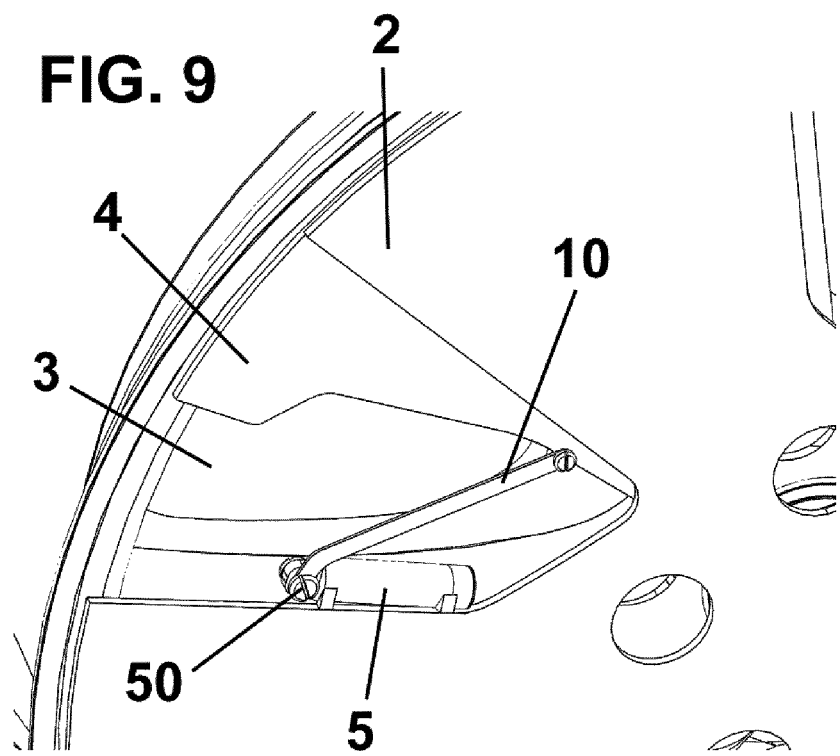

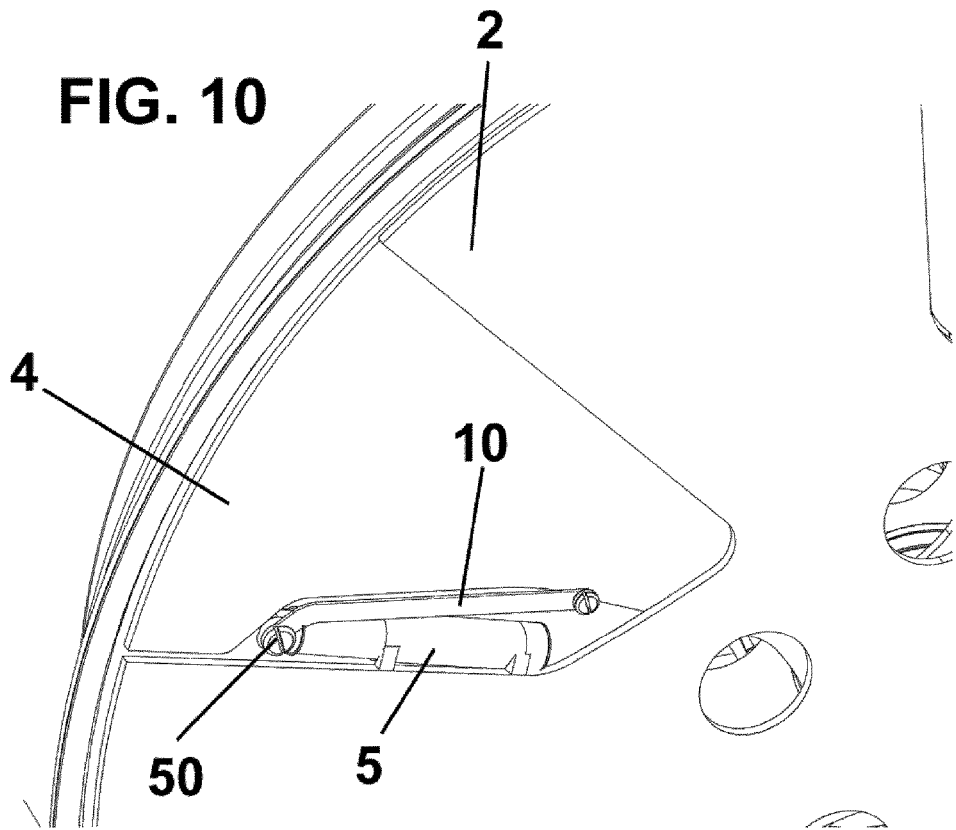

WHEEL TRIM

RELATED APPLICATIONS

This application is a § 371 national stage of PCT International Application No. PCT/EP2015/065850, filed Jul. 10, 2015, claiming priority of European Patent Applications EP1532013.9, filed Jan. 23, 2015 and EP14176538.8, filed Jul. 10, 2014, the contents of each of which are hereby incorporated by reference into this application.

The present invention refers to a wheel trim, particularly to an aerodynamic wheel trim that streamlines the air flow over the face of the wheel, decreasing the consumption of fuel for the vehicle.

BACKGROUND OF THE INVENTION

Air flow over the back of the wheel is generally sufficient to keep the vehicle brakes cooled to a proper functioning level. However, when the vehicle is going very slow or when the vehicle brakes are hot and the vehicle is suddenly stopped, the temperature of the brake will be increased, requiring more air flow through the wheel.

Holes in the trim of the wheel are provided to allow more air flow through the wheel during these conditions, but these holes reduce the smooth air flow over the external face of the wheel as the vehicle speed increases.

If a solid wheel trim is used, i.e. with no holes, the consumption of fuel is lower than the consumption with a wheel trim provided with holes under the same conditions. However, this solution causes higher brake temperatures for the conditions stated above.

There are known wheels trims provided with holes and comprising one or more elements that, when the speed of the car is high enough, close the holes and permit a smooth air flow over the external face of the wheel, reducing the consumption of fuel.

In these prior art trims, this or each element is associated with a spring, so that the centrifugal force of the wheel, when the vehicle reaches a preset high speed, the or each element against the pressure exerted by the spring to close the holes, and when the speed is lower than said preset speed, the or each element returns to its original position, leaving the holes opened.

However, these known trims do not take into account the temperature of the brakes, just the speed of the vehicle, and they can prevent a suitable cooling of the brakes.

Therefore, the objective of the invention is to provide a wheel trim that permits a lower consumption of fuel when the vehicle runs at a high speed and, at the same time, permits to guarantee a suitable cooling of the brakes, and said wheel trim being simple while keeping the cost as low as possible.

DESCRIPTION OF THE INVENTION

With the wheel trim of the invention said drawbacks can be solved, presenting other advantages that will be described hereinafter.

The wheel trim according to the invention comprises a base element provided with holes and a cover element placed on said base element, the cover element being linked with the base element by a speed activation element and said cover element being movable between a rest position, in which the holes are not covered by the cover element, and an active position, in which the holes are completely or partially covered by the cover element, when the rotating speed of the wheel is higher than a preset speed, and it is characterized in that the cover element is also linked with the base element by a temperature activation element, so that when the temperature sensed by said temperature activation element is higher than a preset temperature, the temperature activation element moves the cover element to said rest or open position.

According to a preferred embodiment, the temperature activation element is a spring made of a shape memory alloy, such as a two-way memory effect shape memory alloy, and the speed activation element can be a metallic spring or a gas cylinder.

Preferably, a first end of the temperature activation element and/or the speed activation element is fixed to the base element and a second end of the temperature activation element and/or the speed activation element is fixed to the cover element, said second end being movable inside a groove provided in the base element.

The cover element is preferably attached to the base element by a central bearing that permit the rotation of the cover element with respect to the base element, and the base element comprises a plurality of retaining elements for attaching the trim to a wheel.

According to an embodiment, the speed activation element comprises a body at one of its ends, so that when the rotating speed of the wheel trim is higher than a preset speed, the speed activation element moves said cover element to said active position.

Furthermore, said speed activation element and/or the temperature activation element is/are preferably linked to said cover element by an arm.

Preferably, a first end of the temperature activation element and/or the speed activation element is fixed to the base element and a second end of the temperature activation element and/or the speed activation element is linked to the cover element by an arm, the second end of the arm being movable inside a groove provided in the base element.

With the wheel trim according to the invention it can optimize the consumption of fuel, because the holes in the base element are at least partially covered when the vehicle runs above a preset speed, and at the same time, opens the holes when the temperature between the wheel and wheel trim is above a preset temperature.

Furthermore, the construction of the temperature activation element and/or of the speed activation element is very simple.

BRIEF DESCRIPTION OF THE DRAWINGS

For a better understanding of what has been disclosed, some drawings are attached in which, diagrammatically and only as a non-limitative example, one embodiment is shown.

FIGS. 9 and 10 are perspective views of the wheel trim according to a fourth embodiment of the invention in the rest and active positions, respectively.

DESCRIPTION OF A PREFERRED EMBODIMENT

Figure 1:
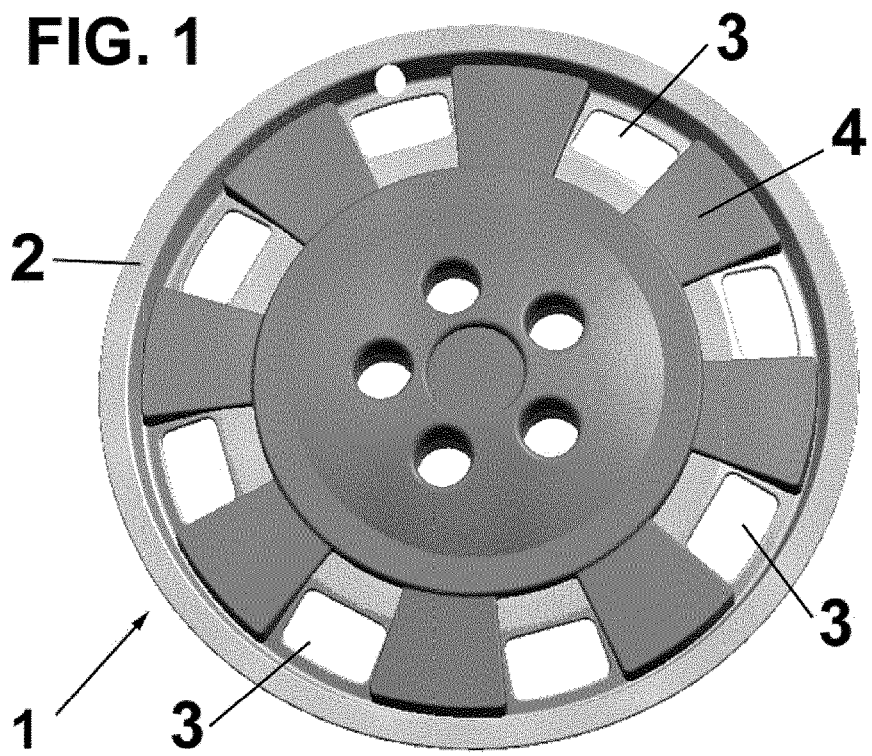
FIG. 1 is a frontal view of a first embodiment of the wheel trim according to the invention in its rest position or in the position when the vehicle is stopped or runs at low speed or when the brakes are a temperature higher than a preset temperature.

The wheel trim according to the invention, identified generally by numeral 1, comprises a base element 2 that is fixed to a wheel (not shown) of a vehicle by a plurality of retaining elements 9, and a cover element 4 that is placed in the base element 2 and is movable (e.g. rotatable) with respect to this base element 2. To permit this movement, the base element 2 and the cover element 4 are preferably linked by a central bearing 8.

The base element 2 comprises a plurality of holes 3, preferably distributed around the periphery of the base element 2, as shown in FIG. 1.

Figure 2:
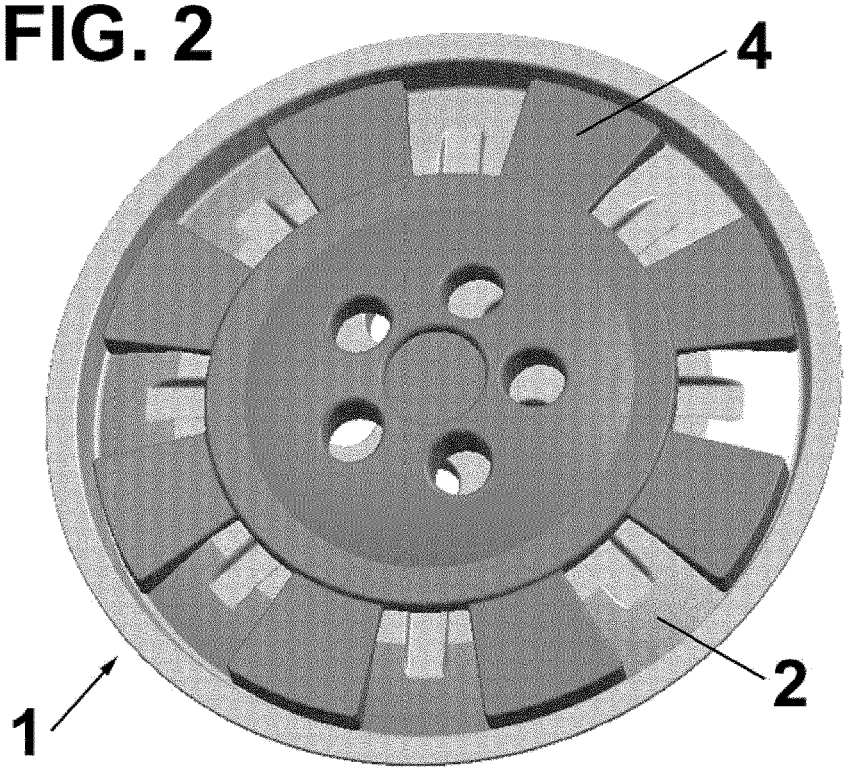
FIG. 2 is a frontal view of the first embodiment of the wheel trim according to the invention in its active position when the vehicle runs at high speed.

The cover element 4 is movable between a rest position, shown in FIG. 1, in which the cover element 4 does not cover the holes 3, and an active position, shown in FIG. 2, in which the cover element 4 covers the holes 3.

It must be pointed out that the cover element 4 can also be placed in any intermediate position between these rest and active position. However, for simplicity reasons, in this description and in the claims, the active position must be considered any position in which the holes 3 are completely or partially covered by the cover element 4.

The cover element 4 is placed automatically in its rest position when the vehicle is stopped or runs at low speed or when the brakes are a temperature higher than a preset temperature, as will be described hereinafter.

For moving the cover element 4, the wheel trim 1 according to the invention comprises a speed activation element 5 that moves the cover element 4 from the rest position to the active position when the vehicle runs above a preset speed. According to alternative embodiments, the speed activation element 5 is a spring, such as a helical metallic spring, or a gas cylinder.

The wheel trim 1 according to the invention also comprises a temperature activation element 6 that moves the cover element 4 from the active position to the rest position when the temperature sensed by this temperature activation element 6 is above a preset temperature. According to a preferred embodiment, this temperature activation element 6 is a spring made from a shape memory alloy, such as a two-way shape memory alloy, i.e. a spring that can adopt two different shapes, one shape when the temperature is above a preset temperature and another shape when the temperature is below said preset temperature.

Figure 3:
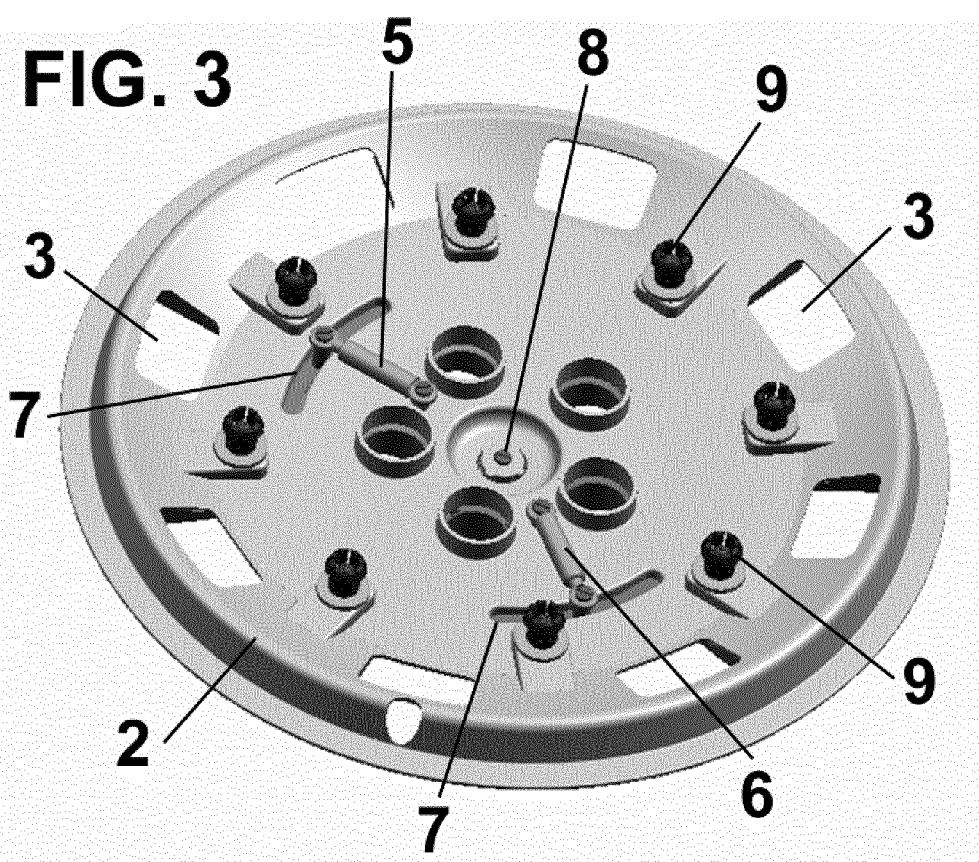
FIG. 3 is a rear view of the first embodiment of the wheel trim according to the invention in its rest position or in the position when the vehicle is stopped or runs at low speed or when the brakes are a temperature higher than a preset temperature.
Figure 4:
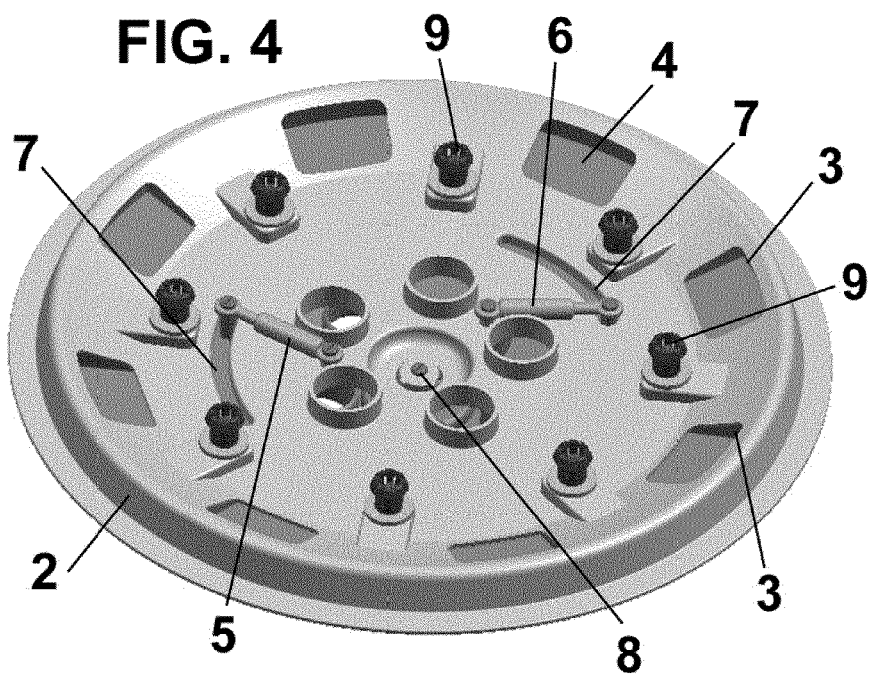
FIG. 4 is a rear view of the first embodiment of the wheel trim according to the invention in its active position when the vehicle runs at high speed.

As shown in FIGS. 3 and 4, each of the speed activation element 5 and the temperature activation element 6 comprises two ends, a first end fixed to the base element 2 and a second end fixed to the cover element 4, said second end being movable inside a curved groove 7 provided in the base element 2.

In the rest position, shown in FIG. 3, this second end each of the speed activation element 5 and the temperature activation element 6 is placed in a middle portion of the groove 7, and in the active position, shown in FIG. 4, this second end each of the speed activation element 5 and the temperature activation element 6 is placed in an end portion of the groove 7.

The operation of the activation elements 5, 6 is the following.

When the vehicle is stopped, the cover element 4 is its rest position by the action of the speed activation element 5. When the vehicle runs at a speed above a preset speed, the centrifugal force of the wheel itself will overcome the force exerted by the activation element 5 and will be rotated to the active position, covering the holes 3.

Furthermore, when the vehicle returns to a speed below said preset speed, the cover element 4 will return to its rest position.

In any case, if the temperature of the temperature activation element 6 is above a preset temperature, thanks to the features of the shape memory alloy, this activation element 6 will move the cover element 4 to its rest position 4, not covering the holes 3. The main reason of the increase of the temperature of the temperature activation element 6 is the heat from the brakes of the vehicle, and the holes 3, not covered by the cover element 4 will permit the cooling of the brakes.

Figure 5:
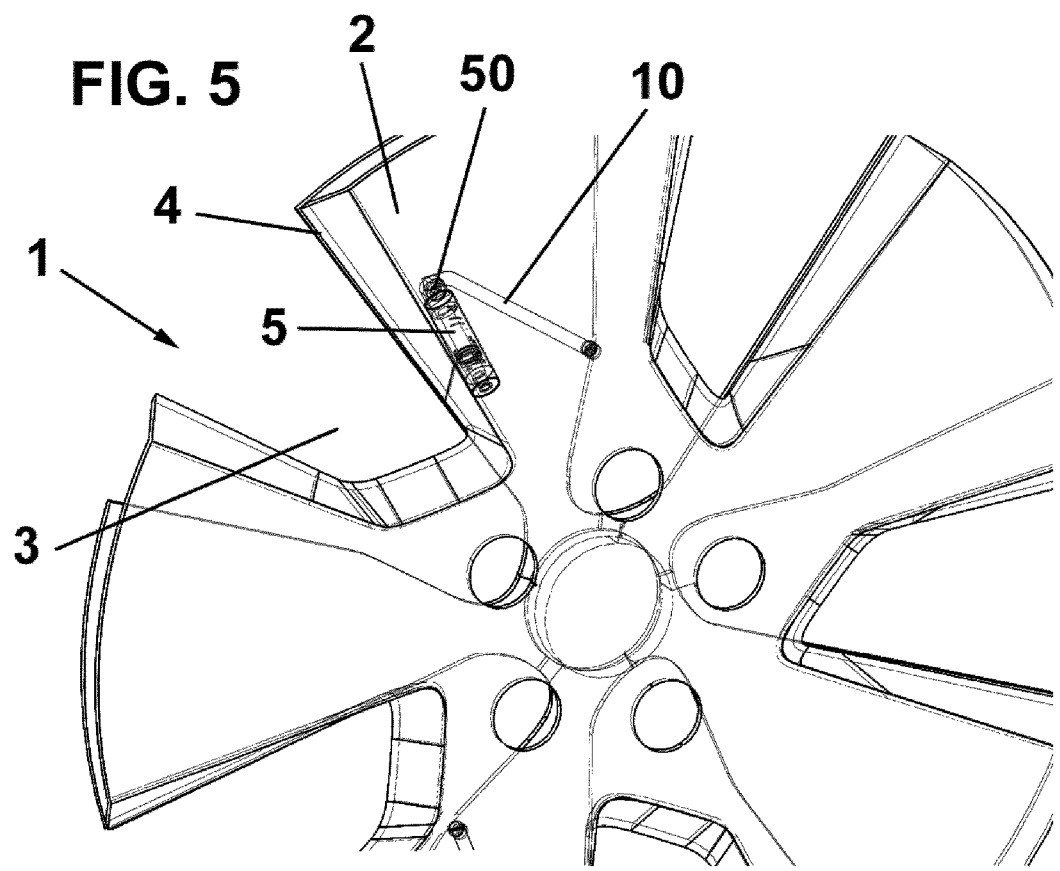
FIGS. 5 and 6 are perspective views of the wheel trim according to a second embodiment of the invention in the rest and active positions, respectively.
Figure 6:
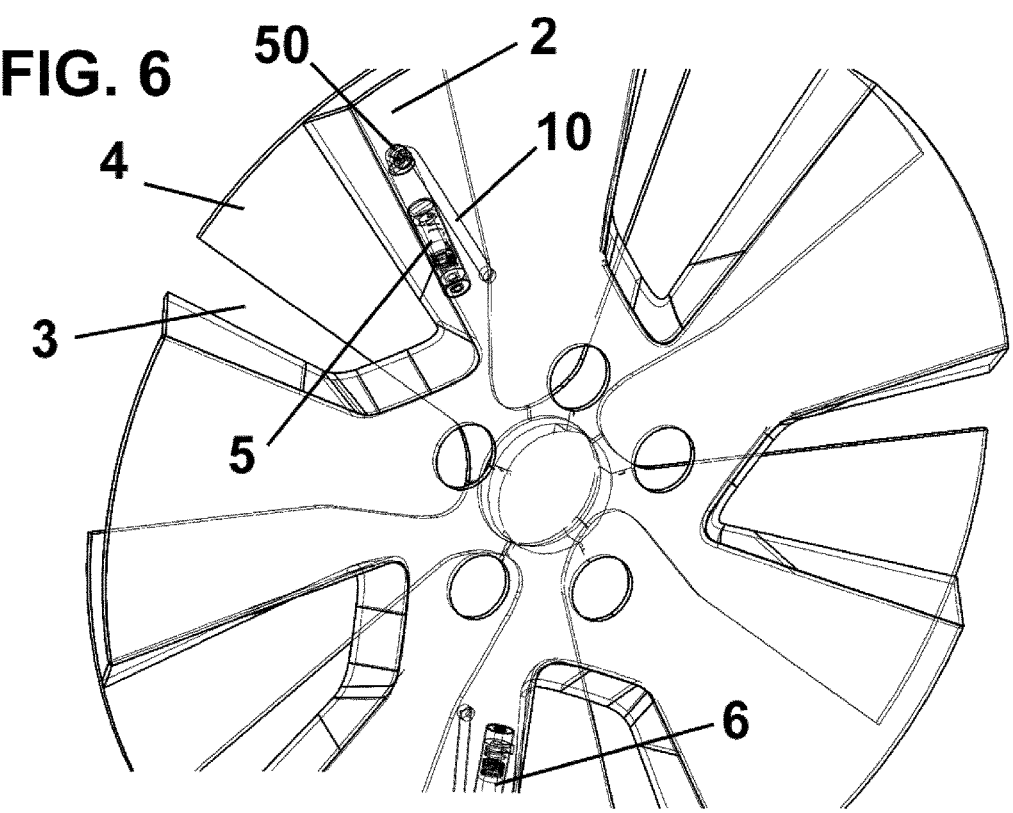

A second embodiment of the wheel trim according to the invention is shown in FIGS. 5 and 6. For simplicity reasons the same numeral references than in the previous embodiment are used for indicating the same or equivalent elements.

In this second embodiment, the speed activation element 5 comprises a body 50 at one of its ends, so that when the rotating speed of the wheel trim 1 is higher than a preset speed, the speed activation element 5 moves said cover element 4 to said active position. This body 50 has a weight that is enough to permit the movement of the cover element 4 from the rest position to the active position when the vehicle runs above said preset speed.

For moving the cover element 4, said speed activation element 5 is linked with the cover element 4 by an arm 10, as shown in the drawings.

Figure 7:
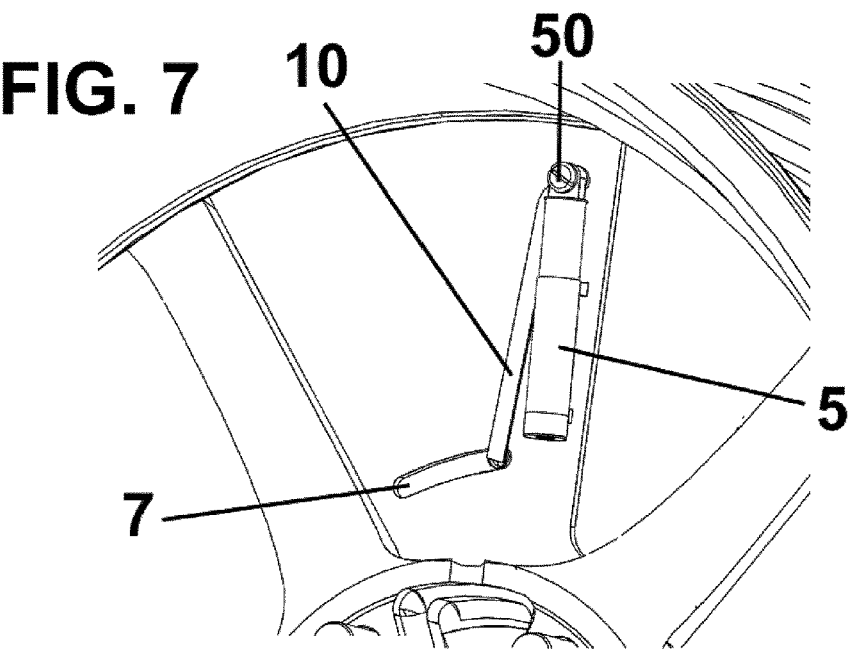
FIGS. 7 and 8 are perspective views of the wheel trim according to a third embodiment of the invention in the rest and active positions, respectively.
Figure 8:
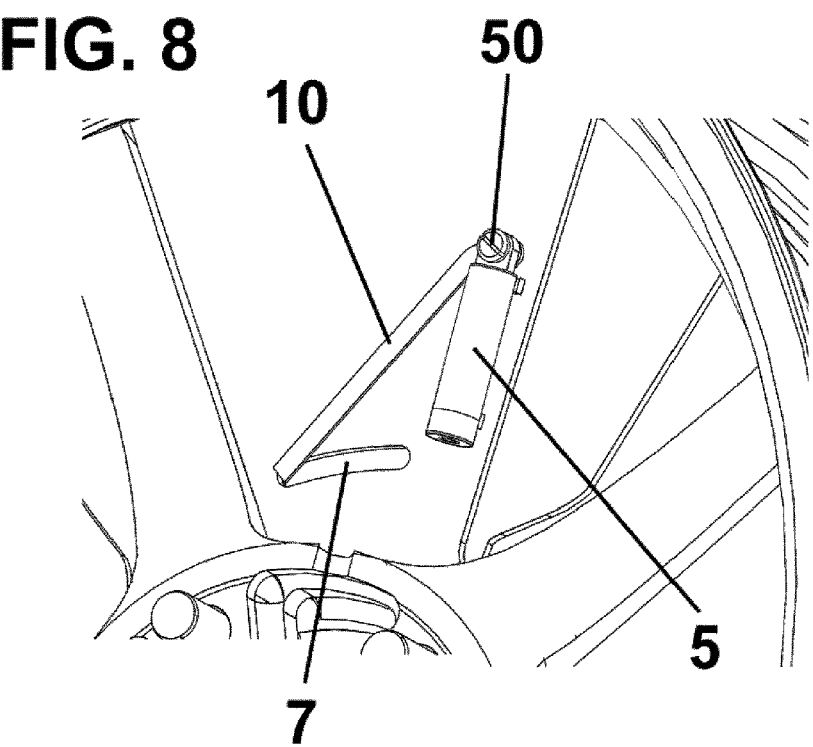

A third embodiment of the wheel trim according to the invention is shown in FIGS. 7 and 8, in which each of the speed activation element 5 and the temperature activation element 6 comprises two ends, a first end fixed to the base element 2 and a second end linked to the cover element 4 by said arm 10, being the second end of the arm 10 movable inside a curved groove 7 provided in the base element 2.

In this embodiment, the cover element 4 is in the face of the wheel and the activation elements 5, 6 behind the base element 2.

A fourth embodiment of the wheel trim according to the invention is shown in FIGS. 9 and 10, in which the activation elements 5, 6 are seen, but they are under the level of the base element 2.

Even though reference has been made to a specific embodiment of the invention, it is apparent for a person skilled in the art that the wheel trim discloses is susceptible of numerous variations and modifications, and that all the details mentioned can be substituted by other technically equivalent ones, without departing from the scope of protection defined by the attached claims.

The invention claimed is:

1. A wheel trim (1) comprising:
  a base element (2) provided with holes (3); and
  a cover element (4) placed on said base element (2), the cover element (4) being linked with the base element (2) by a speed activation element (5) and said cover element (4) being movable between a rest position, in which the holes (3) are not covered by the cover element (4), and an active position, in which the holes (3) are completely or partially covered by the cover element (4), when a rotating speed of the wheel is higher than a preset speed, wherein the cover element (4) is also linked with the base element (2) by a temperature activation element (6) which moves the cover element (4) to said rest position when a temperature sensed by said temperature activation element (6) is higher than a preset temperature, wherein a first end of each of the temperature activation element (6) and the speed activation element (5) is fixed to the base element (2) and a second end of each of the temperature activation element (6) and the speed activation element (5) is linked to the cover element (4) by an arm (10), a second end of the arm (10) being movable inside a groove (7), provided in the base element (2).

2. The wheel trim (1) according to claim 1, wherein the temperature activation element (6) is a spring made of a shape memory alloy.

3. The wheel trim (1) according to claim 2, wherein the cover element (4) is attached to the base element (2) by a central bearing (8) that permits the rotation of the cover element (4) with respect to the base element (2).

4. The wheel trim (1) according to claim 2, wherein the base element (2) comprises a plurality of retaining elements (9) for attaching the trim (1) to a wheel.

5. The wheel trim (1) according to claim 2, wherein the speed activation element (5) comprises a body (50) at one of its ends, so that when the rotating speed of the wheel tram (1) is higher than the preset speed, the speed activation element (5) moves said cover element (4) to said active position.

6. The wheel trim (1) according to claim 1, wherein the speed activation element (5) is a metallic spring or a gas cylinder.

7. The wheel trim (1) according to claim 6, wherein the cover element (4) is attached to the base element (2) by a central bearing (8) that permits the rotation of the cover element (4) with respect to the base element (2).

8. The wheel trim (1) according to claim 6, wherein the base element (2) comprises a plurality of retaining elements (9) for attaching the trim (1) to a wheel.

9. The wheel trim (1) according to claim 6, wherein the speed activation element (5) comprises a body (50) at one of its ends, so that when the rotating speed of the wheel trim (1) is higher than the preset speed, the speed activation element (5) moves said cover element (4) to said active position.

10. The wheel trim (1) according to claim 1, wherein the cover element (4) is attached to the base element (2) by a central bearing (8) that permits the rotation of the cover element (4) with respect to the base element (2).

11. The wheel trim (1) according to claim 1, wherein the base element (2) comprises a plurality of retaining elements (9) for attaching the trim (1) to a wheel.

12. The wheel trim (1) according to claim 1, wherein the speed activation element (5) comprises a body (50) at one of its ends, so that when the rotating speed of the wheel trim (1) is higher than the preset speed, the speed activation element (5) moves said cover element (4) to said active position.

13. A wheel trim (1) comprising:
a base element (2) provided with holes (3); and
a cover element (4) placed on said base element (2), the cover element (4) being linked with the base element (2) by a speed activation element (5) and said cover element (4) being movable between a rest position, in which the holes (3) are not covered by the cover element (4), and an active position, in which the holes (3) are completely or partially covered by the cover element (4), when a rotating speed of the wheel is higher than a preset speed, wherein the cover element (4) is also linked with the base element (2) by a temperature activation element (6) which moves the cover element (4) to said rest position when a temperature sensed by said temperature activation element (6) is higher than a preset temperature, and wherein each of a first end of the temperature activation element (6) and the speed activation element (5) is fixed to the base element (2) and each of a second end of the temperature activation element (6) and the speed activation element (5) is fixed to the cover element (4), said second end being movable inside a groove (7) provided in the base element (2).

14. The wheel trim (1) according to claim 13, wherein said speed activation element (5) is linked to said cover element (4) by an arm (10).

15. The wheel trim (1) according to claim 13, wherein said temperature activation element (6) is linked to said cover element (4) by an arm (10).

16. The wheel trim (1) according to claim 13, wherein the temperature activation element (6) is a spring made of a shape memory alloy.

17. The wheel trim (1) according to claim 13, wherein the speed activation element (5) is a metallic spring or a gas cylinder.

18. The wheel trim (1) according to claim 13, wherein the cover element (4) is attached to the base element (2) by a central bearing (8) that permits the rotation of the cover element (4) with respect to the base element (2).

19. The wheel trim (1) according to claim 13, wherein the base element (2) comprises a plurality of retaining elements (9) for attaching the trim (1) to a wheel.

20. The wheel trim (1) according to claim 13, wherein the speed activation element (5) comprises a body (50) at one of its ends, so that when the rotating speed of the wheel trim (1) is higher than the preset speed, the speed activation element (5) moves said cover element (4) to said active position.

* * * * *